(12) United States Patent
Bedini (10) Patent No.: US 7,990,110 B2
(45) Date of Patent: Aug. 2, 2011

(54) CIRCUITS AND RELATED METHODS FOR CHARGING A BATTERY

(76) Inventor: John C. Bedini, Coeur d'Alene, ID (US)

( * ) Notice: Subject to any disclaimer, the term of this patent is extended or adjusted under 35 U.S.C. 154(b) by 400 days.

(21) Appl. No.: 11/592,633

(22) Filed: Nov. 3, 2006

(65) Prior Publication Data

US 2008/0129250 A1 Jun. 5, 2008

(51) Int. Cl.
H02J 7/00 (2006.01)
H02J 7/04 (2006.01)
H02J 7/06 (2006.01)

(52) U.S. Cl. ......... 320/139; 320/137; 320/163; 320/128

(58) Field of Classification Search .................. 320/139, 320/140, 141, 145, 165, 128; 363/15, 21.06, 363/18
See application file for complete search history.

(56) References Cited

U.S. PATENT DOCUMENTS

| | | | | |
|---|---|---|---|---|
| 4,496,896 A | * | 1/1985 | Melocik et al. | 320/108 |
| 4,660,139 A | * | 4/1987 | Nellen et al. | 363/68 |
| 5,932,994 A | * | 8/1999 | Jo et al. | 323/222 |
| 6,081,104 A | * | 6/2000 | Kern | 323/268 |
| 6,255,804 B1 | * | 7/2001 | Herniter et al. | 320/137 |
| 7,439,708 B2 | * | 10/2008 | Aradachi et al. | 320/111 |
| 2006/0035116 A1 | * | 2/2006 | Kanouda et al. | 429/9 |
| 2006/0214639 A1 | * | 9/2006 | Miwa et al. | 320/134 |
| 2007/0210758 A1 | * | 9/2007 | Gangstoe et al. | 320/134 |

* cited by examiner

*Primary Examiner* — Edward Tso
*Assistant Examiner* — Ahmed Omar
(74) *Attorney, Agent, or Firm* — Kevin D. Jablonski; Graybeal Jackson LLP (57) ABSTRACT

An aspect of the present invention provides a circuit for generating a voltage that can be used to recharge a battery. The circuit includes an inductive voltage generator operable to generate a magnetic field when the voltage generator is energized by power, and operable to generate a voltage from the magnetic field's collapse when the voltage generator is de-energized, and a switch operable to allow the voltage generator to receive power to energize the voltage generator, and operable to disconnect the power from the voltage generator to de-energize the generator. With this circuit, a power source that generates less voltage than the fully charged capacity of a rechargeable battery can be used to recharge the battery. Also, the circuit can convert power in different forms, such as constant direct current, varying direct current, or alternating current, into a second voltage for charging a battery. Furthermore, the circuit can supply whatever charging voltage is most suitable for the specific battery that is being charged. Current is delivered to the battery in the form of high energy impulses which can improve the proper removal or deposit of material from/on an electrode of the battery. Consequently the life of the battery being charged by the circuitry employed by the present invention is significantly extended, and, in many cases, a battery that is unable to be charged by traditional means, can be restored to a useable condition.

48 Claims, 3 Drawing Sheets

CIRCUITS AND RELATED METHODS FOR CHARGING A BATTERY

BACKGROUND

Many types of batteries, such as lead-acid, nickel-cadmium, and lithium-ion, can be recharged to replenish their charge and thus be used again to power a device such as an MP3 player, an electric motor for a golf cart, or a starter motor for an internal combustion engine. An advantage to using a rechargeable battery to power a device is that one does not have to purchase many single-use batteries to power the device.

The process for recharging a battery involves applying a current to the battery that is opposite in polarity to the discharge current generated by the battery. The applied current reverses the battery's chemical process that occurs in the discharge cycle, and causes material to be deposited on and/or removed from one or more of the battery's electrodes. Some recharge processes provide the depleted battery a constant current at a voltage that is slightly higher than the standing voltage of the battery when it is fully charged. A problem with this process is that the current does not decrease as the battery nears its full charge capacity. Thus, the battery receives more current than the chemical process can consume when the battery nears it charge capacity. The excess current can damage the battery by:

1) Converting a portion of its electrolyte into gas which is vented from the battery,
2) Improperly removing material from or depositing material to an electrode of the battery, or
3) Excessively heating the battery.

Another recharge process provides the depleted battery a current at a constant voltage that is slightly higher than the fully recharged capacity of the battery. Thus, as the depleted battery is recharged, the voltage difference between the charging source and the battery decreases, causing the current delivered to the battery to decrease. One problem with this process is that it takes significantly longer for the depleted battery to reach its full charge capacity at the end of the recharge cycle. Another problem is that the battery can suffer the same damaging effects of the constant current recharge process during the beginning of a constant voltage recharge cycle because there is an excessive current caused by an initially high difference in voltage between the charging source and the battery at the beginning of the recharge cycle.

A problem common to both the constant current and constant voltage charging methods is the inability of the battery to completely reverse all of the battery chemistry to the original condition it had before it was discharged. In other words, with each discharge/recharge cycle there exists a portion of the battery's chemistry that is not converted back to the charged condition. This results in successive degradation of the battery with each discharge/recharge cycle until the battery's capacity is lowered beyond a state of practical use and must be replaced.

SUMMARY

An aspect of the present invention provides a circuit for generating a voltage that can be used to recharge a battery. The circuit includes a supply node operable to receive electrical power having a first voltage, a voltage generator operable to generate a magnetic field when the voltage generator is energized by electrical power, and operable to generate a second voltage from the magnetic field's collapse when the voltage generator is de-energized, an output node operable to provide access to the second voltage, and a switch operable to allow the voltage generator to receive power to energize the voltage generator and operable to disconnect the power from the voltage generator to de-energize the voltage generator.

With this circuit, a power source that generates less voltage than the fully charged capacity of a rechargeable battery can be used to recharge the battery. As is well known in the art, charging systems employing a solar or wind powered voltage source can only use the power delivered by these sources when the source voltage level is above the voltage level of the battery to be charged. When powered by sources such as solar or wind powered voltage sources under less than optimum conditions, the circuit is able to use power not normally available to charge a battery, i.e. power whose voltage is below that of the battery to be charged. For example, the circuit can operate from a power source providing 0.7 volts to fully recharge a 12 volt battery. Also, the circuit can convert power in different forms, such as constant direct current, direct current that varies over time, or alternating current, into a second voltage for charging a battery. Furthermore, current is delivered to the battery in the form of high energy impulses which can improve the proper removal or deposit of material from/on an electrode of the battery. Consequently the life of the battery being charged by the circuit can be significantly extended, and, in many cases, a battery that is unable to be charged by traditional means can be restored to a useable condition.

DETAILED DESCRIPTION

Figure 1:
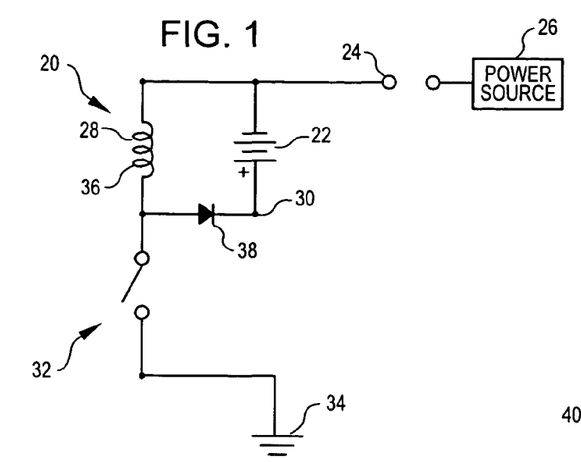
FIG. 1 is a schematic view of a circuit according to an embodiment of the invention.

FIG. 1 is a schematic view of a circuit 20 according to an embodiment of the invention. The circuit 20 can be used to recharge a battery 22, and can also be used to repair and/or rejuvenate a battery by improving the proper removal or deposit of material from/on an electrode of the battery. The circuit 20 includes a supply node 24 that can be coupled to a source 26 of power having a voltage. The circuit 20 also includes a voltage generator 28 that generates a magnetic field when the power from the source 26 energizes the generator 28, and that generates a voltage from the magnetic field's collapse when the generator 28 is de-energized. The circuit 20 also includes an output node 30 that provides access to the voltage generated by the voltage generator 28, and a switch 32 to allow one to control the flow of power from the source 26 to the generator 28 to energize or de-energize the generator 28.

In operation, the circuit 20 generates a voltage spike—a high voltage condition lasting for a short period of time—from the collapse of a magnetic field that is generated by the voltage generator 28. Because the magnetic field collapses quickly, the voltage spike forms quickly, and the voltage in the spike is high. When the magnetic field is generated and then collapses, repeatedly, the circuit 20 generates a series of voltage spikes. Each voltage spike is directed to the output node 30 where it is available for use by the battery 22 or some other device. When the circuit 20 generates a series of voltage spikes, the voltage available at the output node 30 pulsates. Thus, the circuit 20 can apply sharp, high-voltage spikes to recharge the battery 22.

The voltage generator 28 generates the magnetic field from current flowing through the generator 28. When the voltage generator 28 is coupled to the power source 26 and the switch 32 is closed, the voltage of the source's power causes current to flow through the generator 28 and toward ground 34, thus energizing the generator 28. To collapse the magnetic field generated by the generator 28, one opens the switch 32 to stop the flow of current through the generator 28, thus de-energizing the generator 28.

Because the voltage spikes are brief moments of high voltage, the spikes can be used to provide a battery 22 pulses of substantial current to recharge the battery 22 without generating excessive heat in the batteries anode and cathode plates. Current delivered to the battery in the form of these high energy impulses can improve the proper removal or deposit of material from/on an electrode of the battery. In addition, because the voltage of the voltage spikes is typically greater than the voltage of the power source 26, the circuit 20 can be used to recharge a battery 22 having a remaining voltage or a fully charged voltage that is greater than the voltage of the power provided by the source 26.

Still referring to FIG. 1 the power source 26 can be any desired power source capable of providing enough power to energize the voltage generator 28. For example, in this and certain other embodiments the power source 26 provides a substantially constant 10 volts. Thus, when switch 32 is closed, direct current flows through the voltage generator 28. In other embodiments, the power source 26 can provide a voltage and current that varies over time. An example of such a power source includes a solar cell array that generates a voltage and current during the night or cloudy days that is less than the voltage and current it generates on a sunny day. Another example of a varying voltage source includes a windmill whose available power varies with wind speed. The advantage of the present invention when using such solar or wind powered voltage sources is that the circuit is able to charge a battery whose voltage is significantly higher than the voltage delivered by the power source. In still other embodiments, the power source 26 can provide a voltage that follows a saw tooth or sinusoidal pattern over time. If the power source 26 provides AC power, the power should be rectified and filtered before powering the voltage generator 28. Because the pulse of voltage spikes at the output node 30 depends on the opening and closing sequence of the switch 32, the circuit 20 can also modify the form of the power from the power source 26.

Still referring to FIG. 1, the voltage generator 28 includes a component that generates a magnetic field when energized. For example, in some embodiments of the voltage generator, the component is a conductor 36 coiled around an axis (not shown) similar to a conventional inductor, and has an inductance of 200 µH. The strength of the magnetic field generated by the conductor 36 when energized, and thus the voltage generated as the field collapses, depends on the amount of current flowing through the generator 28, the size of each coil in the conductor, and the number of coils in the conductor. The specific size of each coil in the conductor and the specific number of coils in the conductor can be any desired size and number that provides a desired field strength.

Other embodiments of the component of the voltage generator 28 are possible. For example, as discussed in greater detail in conjunction with FIG. 7, the component may be a conductor that is substantially straight; not coiled around an axis. As another example, the component may include a conductor in the vicinity of an iron, ferrite, or other magnetically affected material to alter the inductance of the voltage generator.

Still referring to FIG. 1, the switch 32 can be any switch capable of opening and closing the circuit to allow one to control the flow of current through the generator 28. For example, in this and certain other embodiments, the switch is a conventional mechanically operated switch. When switch 32 is closed, current flows through the voltage generator 28 to energize the generator 28. When switch 32 is opened, power stops flowing through the voltage regulator 28 to de-energize the generator 28.

Other embodiments of the switch 32 are possible. For example, the switch may be electrically operated as discussed in greater detail in conjunction with FIGS. 2-5.

Still referring to FIG. 1, the circuit 20 also includes a component for isolating the voltage generated by the voltage generator 28. For example, in this and certain other embodiments the component includes a diode or other rectifying device 38 that allows current to flow from the generator 28 to the output node 30 but not in the opposite direction. Thus, the voltage generated by the battery 22 can remain isolated from the voltage generator 28 while the generator 28 is energized.

Figure 2:
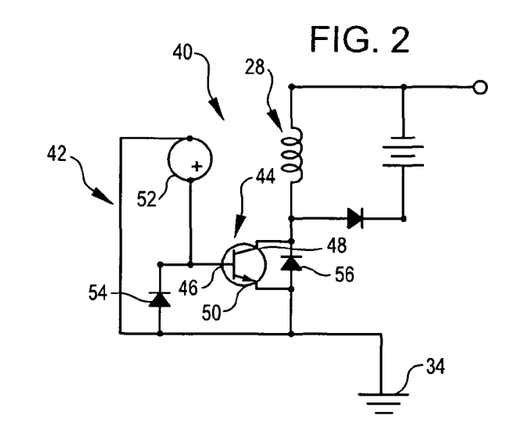
FIG. 2 is a schematic view of a circuit according to another embodiment of the invention.

FIG. 2 is a schematic view of a circuit 40 according to another embodiment of the invention. The circuit 40 is similar to the circuit 20 but includes a switch 42 that is electrically operated; not mechanically operated. The switch 42 includes a transistor 44 to control the flow of current through the voltage generator 28, and a trigger 46 to control the operation of the transistor 44.

The transistor 44 includes a base 46, a collector 48, and an emitter 50. When the base 46 receives a voltage that is greater than a threshold voltage, current can flow into the collector 48 through the transistor 44 to the emitter 50, and thus the transistor is closed. When the voltage at the base 46 is less than the threshold voltage, current does not flow into the collector 48 through the transistor 44 and out the emitter 50, and thus the transistor is open.

The transistor 44 can be any desired transistor that allows one to control the flow of current through the voltage generator 28. For example, in this and certain other embodiments, the transistor 44 is an NPN bipolar transistor having a threshold voltage of about 0.7 volts. In other embodiments, the transistor 44 may be a PNP bipolar transistor. In still other embodiments, the transistor 44 may be any desired field-effect transistor such as a MOSFET, JFET, or IGBT that has a source that is functionally equivalent to the emitter 50, a drain that is functionally equivalent to the collector 48, and a gate that is functionally equivalent to the base 46. In still other embodiments, the transistor 44 may be any other desired semiconductor switching device.

The trigger 46 includes a DC pulse generating circuit 52 that provides a voltage to the base 46 of the transistor 44 that is greater than the threshold voltage. Thus, when the DC pulse generator 52 provides a voltage to the base 46, the transistor 44 allows current from the power source 26 to flow through the generator 28, thus energizing the generator 28. When the DC pulse generator 52 does not provide a voltage to the base 46, the transistor 44 prevents current from the power source 26 from flowing through the generator 28, thus de-energizing the generator 28.

Still referring to FIG. 2, the switch 42 also includes diodes 54 and 56 to protect the base 46 and isolate the voltage generated by the generator 28 when the magnetic filed collapses. Diodes 54 and 56 are not necessary to the switch 42, but protect the transistor 44 by routing any negative high voltage transients to ground 34.

Figure 3:
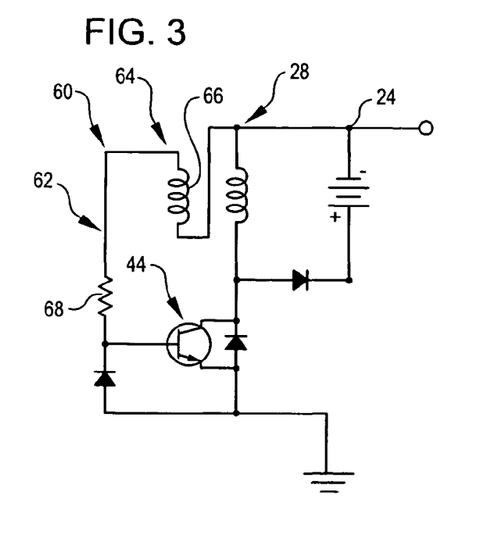
FIG. 3 is a schematic view of a circuit according to yet another embodiment of the invention.

FIG. 3 is a schematic view of a circuit 60 according to yet another embodiment of the invention. The circuit 60 is similar to the circuit 40 (FIG. 2) but includes a switch 62 that automatically closes to energize the voltage generator 28 and automatically opens to de-energize the generator 28—i.e. the circuit 60 oscillates by itself when coupled to the power source 26. With a switch 62 that automatically opens and closes, the circuit 60 can self oscillate when powered from a source whose voltage and current vary. An example of such a power source includes a solar cell array that generates a voltage and current during the night or cloudy days that is less than the voltage and current it generates on a sunny day. Another example of a varying voltage source includes a windmill whose available power varies with wind speed. When using solar or wind powered voltage sources, the circuit 60 is able to recharge a battery whose voltage is significantly higher than the voltage delivered by the power source.

The switch 62 includes a transistor 44 (bipolar transistor, MOSFET, JFET, IGBT, or any other desired semiconductor switching device) to control the flow of current through the voltage generator 28, and a trigger 64 to control the operation of the transistor 44. The trigger 64 generates a voltage opposite to the voltage applied to the transistor's base 46 from the power source 26 (FIG. 1), and opens the transistor 44 when the generated voltage reduces the voltage applied to the base 46 below the transistor's threshold voltage. The power source 26 powers the voltage generator 28, the trigger 64, and the transistor 44, and thus the circuit 60 self-oscillates to energize and de-energize the voltage regulator 28.

Still referring to FIG. 3, in this and certain other embodiments of the trigger 64, the trigger 64 includes a component that generates a voltage from the magnetic field generated by the voltage generator 28. For example, in this and certain other embodiments of the trigger 64, the trigger 64 includes a conductor 66 coiled around an axis (not shown) similar to a conventional inductor, and has an inductance of 200 µh. The coiled conductor 66 can have any desired coil size and any desired number of coils to provide any desired inductance and thus any desired voltage induced by the magnetic field generated by the voltage generator 28.

The coiled conductor 66 is oriented relative to the voltage generator 28 such that current flowing from the power source 26 flows through the coiled conductor in a direction opposite than the direction that current flowing from the power source 28 flows through the generator 28. When power from the source is initially applied to the supply node 24, power flows through the coiled conductor 66 and a voltage is applied at the base of the transistor 44. The switch 62 closes, and power begins to flow through the voltage generator 28. The magnetic field generated by the generator 28 induces a voltage in the coiled conductor 66 that opposes the voltage from the power source 26. When the induced voltage is sufficient to reduce the voltage at the base 46 below the threshold voltage, the transistor 44 opens causing the generator 28 to de-energize. This then causes the magnetic field around the generator 28 to collapse, and thus generate a voltage spike. Because the magnetic field collapses quickly, the voltage spike forms quickly, and the voltage in the spike is high. As the generator's magnetic field collapses, it induces a positive voltage in the coiled conductor 66 that increases and combines with the voltage from the power source 26. When the combined voltage is above the transistor's threshold voltage the transistor 44 closes causing the generator 28 to re-energize. In this manner the circuit 60 can use the power from the power source 26 to generate a series of voltage spikes by self-oscillating the voltage applied to the base 46 of transistor 44, and thus the current that flows through the generator 28.

The oscillation of voltage applied to the base 46 can have any desired period. For example, in this and certain other embodiments the period is 15,000 cycles per second. In other embodiments, the period can be 60 cycles per second. Because the collapse of the generator's magnetic field generates the voltage spike, the amount of voltage in the spike depends on the strength of the magnetic field. Before the magnetic field is fully developed, the strength of the magnetic field depends on the length of time that the current flows through the generator 28. An oscillation period that is long, i.e. the number of cycles per second is few, increases the length of time that current flows through the generator 28 when the switch 62 is closed. Thus the generated magnetic field is strong, and the spike's voltage is high. An oscillation period that is short, i.e. the number of cycles per second is many, decreases the length of time that current flows through the generator 28 when the switch 62 is closed. Thus the generated magnetic field is weaker, and the spike's voltage is less.

Still referring to FIG. 3, the switch 60 can include a resistor 68 having any desired resistance. For example, in this and certain other embodiments, the resistor's resistance is 470 Ohms. The resistance of resistor 68 affects the oscillation period of the voltage applied to the base 46 of the transistor 44. A resistor 68 having a high resistance causes current to flow through the generator 28 for a shorter period than a resistor 68 having a lower resistance.

Figures 4, 5:
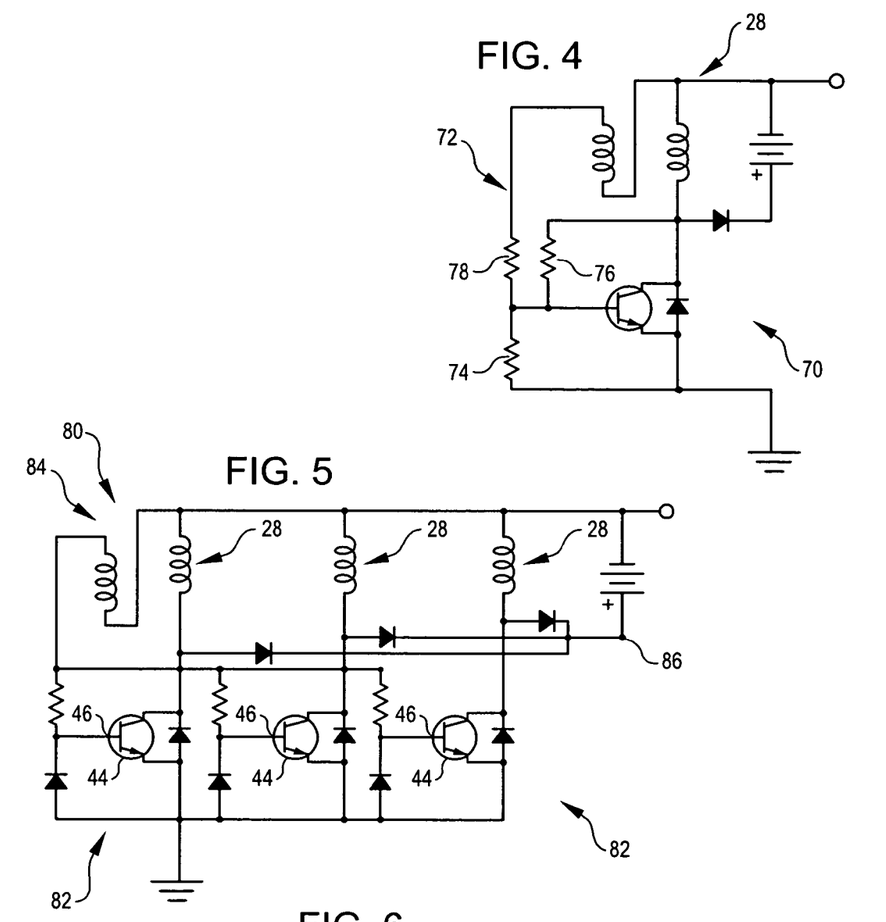
FIG. 4 is a schematic view of a circuit according to yet another embodiment of the invention.
FIG. 5 is a schematic view of a circuit that includes a plurality of circuits similar to the one shown in FIG. 3, according to another embodiment of the invention.

FIG. 4 is a schematic view of a circuit 70 according to yet another embodiment of the invention. The circuit 70 is similar to the circuit 60 (FIG. 3) but includes a switch 72 that has a resistor 74 that replaces the diode 54 (FIG. 2), and resistor 76 to bias the voltage applied to the base 46 of the transistor.

The combination of the resistors 74, 76 and 78, affects the oscillation period of the voltage applied to the base 46 of the transistor 44. Raising the value of resistor 74 causes current to flow through the generator 28 for a shorter period. Raising the value of resistors 76 and/or 78 causes current to flow through the generator 28 for a longer period.

FIG. 5 is a schematic view of a circuit 80 that includes a plurality of circuits 82, each similar to the circuit 60 (FIG. 3), according to another embodiment of the invention. Each circuit 82 includes a voltage generator 28, and a transistor 44. The circuit 80 includes a trigger 84 that is used to oscillate the flow of power through each circuit 82. The circuits 82 are arranged so that the power that each voltage generator 28 generates from the collapse of their respective magnetic fields is combined with the power from the others to make a significant amount of power available at the output node 86. The circuit 80 can have any desired number of circuits 82 to provide a desired amount of power at the output node 86.

Figure 6:
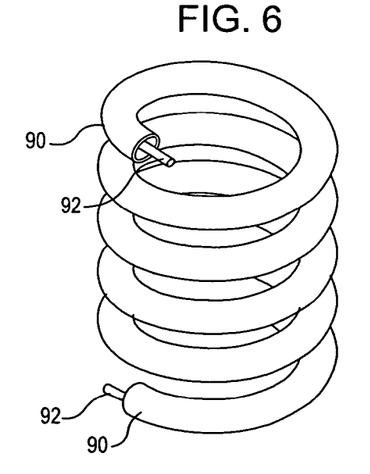
FIG. 6 is a perspective view of one embodiment of the voltage generator of the circuit shown in FIG. 3 and the circuit shown in FIG. 4, according to an embodiment of the invention.

FIG. 6 is a perspective view of a voltage generator's coiled conductor 90 and a trigger's coiled conductor 92 of the circuit 60 shown in FIG. 3 and the circuit 70 shown in FIG. 4, according to an embodiment of the invention. In this embodiment, both coiled conductors 90 and 92 are components of a coaxial cable that has been coiled. In other embodiments, the coiled conductor 90 can be the trigger's coiled conductor, and the coiled conductor 92 can be the voltage generator's coiled conductor.

Figure 7:
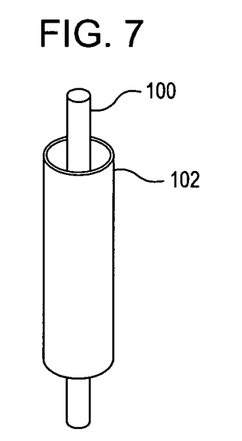
FIG. 7 is a perspective view of one embodiment of the voltage generator of the circuit shown in FIG. 3 and the circuit shown in FIG. 4, according to another embodiment of the invention.

FIG. 7 is a perspective view of a voltage generator's conductor 100 and a trigger's conductor 102 of the circuit 60 shown in FIG. 3 and the circuit 70 shown in FIG. 4, according to another embodiment of the invention. In this embodiment, the voltage generator's conductor 100 and trigger's conductor 102 are shown to be coaxial and straight, not coiled. In other embodiments, the conductor 100 can be the trigger's conductor, and the conductor 102 can be the voltage generator's conductor.

Other embodiments are possible. For example either or both conductors 100 and 102 can have any shape desired to fit any desired application requirements. For example the conductors 100 and 102 can spiral in a single plane as shown in FIG. 9 as would be the case if etched on a common circuit board, or they can serpentine.

Figures 8, 9:
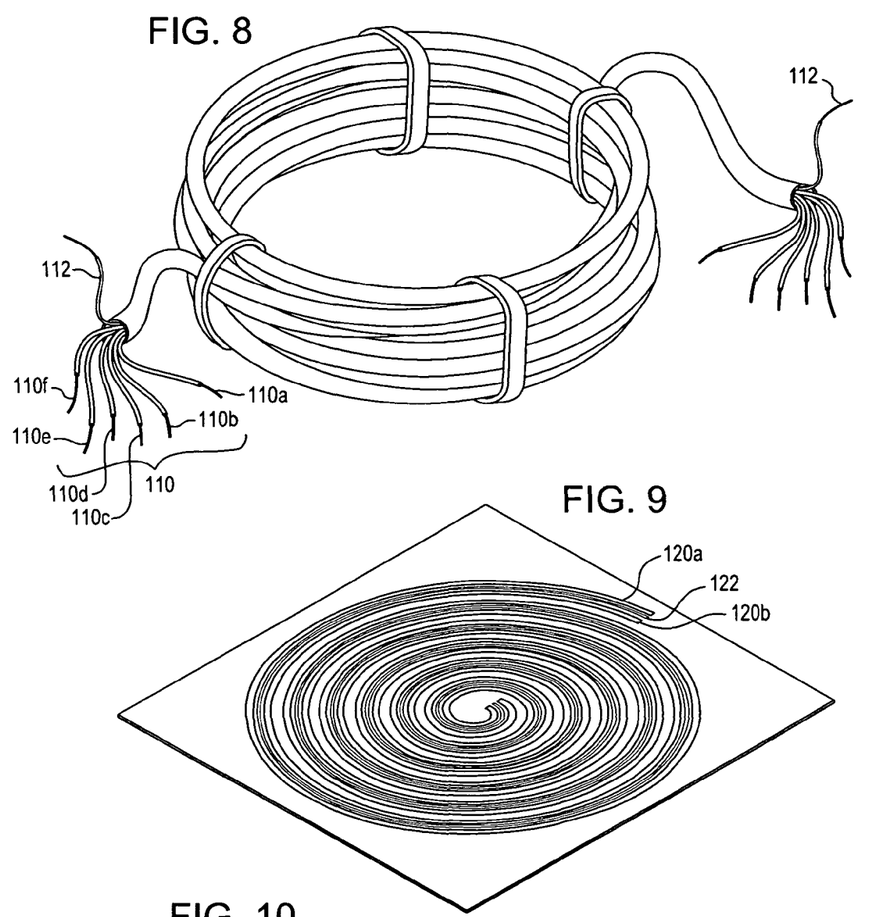
FIG. 8 is a perspective view of one embodiment of the voltage generator of the circuit shown in FIG. 3 and the circuit shown in FIG. 4, according to yet another embodiment of the invention.
FIG. 9 is a perspective view of one embodiment of the voltage generator of the circuit shown in FIG. 3 and the circuit shown in FIG. 4, according to yet another embodiment of the invention.

FIG. 8 is a perspective view of a voltage generator's conductor 110 and a trigger's conductor 112 of the circuit 60 shown in FIG. 3 and the circuit 70 shown in FIG. 4, according to another embodiment of the invention. The conductor 110 includes six separate wires 110*a*, 110*b*, 110*c*, 110*d*, 110*e*, 110*f* that each generate a portion of the magnetic field generated by the generator 28 (FIG. 5) when current flows through the conductor 110, and generate a portion of the voltage generated by the generator from the collapse of their respective portions of the magnetic field. The conductor 112 generates a voltage opposite to the voltage applied to the transistor's base 46 (shown in FIG. 5, but omitted from FIG. 8 for clarity), and opens the transistor 44 (shown in FIG. 5, but omitted from FIG. 8 for clarity) when the generated voltage reduces the voltage applied to the base 46 below the transistor's threshold voltage.

FIG. 9 is a perspective view of a voltage generator's conductor 120 and a trigger's conductor 122 of the circuit 60 shown in FIG. 3 and the circuit 70 shown in FIG. 4, according to another embodiment of the invention. The conductor 120 includes two separate traces 120*a* and 120*b* disposed in/on a circuit board that each generate a portion of the magnetic field generated by the generator 28 (FIG. 5) when current flows through the conductor 120, and generate a portion of the voltage generated by the generator from the collapse of their respective portions of the magnetic field. The conductor 122 generates a voltage opposite the voltage applied to the transistor's base 46 (shown in FIG. 5, but omitted from FIG. 9 for clarity), and opens the transistor 44 (shown in FIG. 5, but omitted from FIG. 9 for clarity) when the generated voltage reduces the voltage applied to the base 46 below the transistor's threshold voltage.

Figures 10, 11:
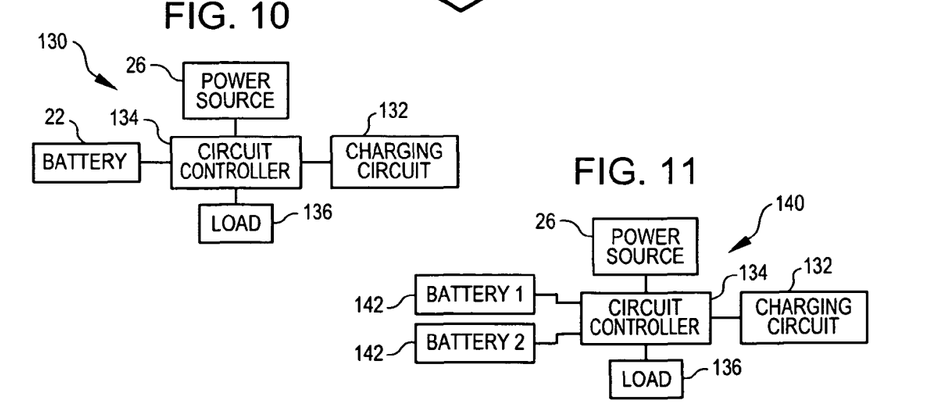
FIG. 10 is a schematic view of a system that includes a charging circuit according to an embodiment of the invention.
FIG. 11 is a schematic view of a system that includes a charging circuit according to another embodiment of the invention.

FIG. 10 is a schematic view of a system 130 that includes a charging circuit 132, according to an embodiment of the invention. The charging circuit 132 can be the circuit 20 (FIG. 1), the circuit 40 (FIG. 2), the circuit 60 (FIG. 3) and/or the circuit 70 (FIG. 4). The system 130 also includes a circuit controller 134 that controls the connection of the power source 26 to the supply node 24 (FIG. 1). The circuit controller 134 can also, if desired, control the connection of the battery 22 to a load 136, such as an electric motor, (if present).

In this and certain other embodiments, the circuit controller 134 includes a processor or microcontroller (not shown) that executes instructions expressed in software, and one or more circuits (also not shown) to monitor operating conditions of the load 136, the battery 22, and/or the charging circuit 132. In this and certain other embodiments, the controller 134 includes a circuit to confirm the presence of the battery 22 before connecting the charging circuit 132 to charge the battery 22. The controller 134 may also include other circuits to detect the voltage and/or temperature of the battery 22 to monitor the voltage and/or temperature and stop the charging process when the battery 22 is fully charged.

FIG. 11 is a schematic view of a system 140 that includes a charging circuit 132, according to another embodiment of the invention. The system 140 is similar to the system 130 except the system 140 includes two batteries 142 and 144. In this and certain other embodiments, each battery 142 and 144 can deliver the amount of power that the load 136 requires, and thus alternately power the load 136. A benefit of this arrangement is that while one of the batteries 142 and 144 powers the load 136, the other battery 144 or 142 can be recharged by the charging circuit 132. Thus, in this and certain other embodiments, the circuit controller 134 can also include a switch (not shown) that connects one of the batteries 142 or 144 to the charging circuit 132 to recharge the battery while the other battery powers the load 136. And, when the powering battery is depleted or the charging battery is fully charged, the switch can connect the recharged battery to the load 136 to power the load, and connect the depleted battery to the charging circuit 132 to recharge the battery.

The preceding discussion is presented to enable a person skilled in the art to make and use the invention. The general principles described herein may be applied to embodiments and applications other than those detailed above without departing from the spirit and scope of the present invention. The present invention is not intended to be limited to the embodiments shown, but is to be accorded the widest scope consistent with the principles and features disclosed or suggested herein.

What is claimed is:

1. A circuit for generating a voltage, the circuit comprising:
a supply node coupled to a conductor operable to receive power having a first voltage;
a voltage generator comprising a single conductor operable to generate a magnetic field when the voltage generator is energized by the power, and operable to generate a second voltage substantially larger than the first voltage, the second voltage generated from the magnetic field's collapse when the voltage generator is de-energized, wherein the voltage generator includes the conductor coiled around an iron bar that generates the second voltage from the magnetic field's collapse;
an output node coupled directly to the conductor operable to provide access to the second voltage; and
a switch operable to allow the voltage generator to receive power to energize the voltage generator, and operable to disconnect the power from the voltage generator to de-energize the voltage generator.

2. The circuit of claim 1 wherein the power includes direct current.

3. The circuit of claim 1 wherein the power includes rectified, filtered alternating current.

4. The circuit of claim 1 wherein the first voltage varies.

5. The circuit of claim 1 wherein the switch includes a mechanical switch.

6. The circuit of claim 1 wherein the switch includes a semiconductor switching device.

7. The circuit of claim 1 wherein the switch includes a transistor.

8. The circuit of claim 1 wherein the switch includes a trigger operable to open the switch.

9. The circuit of claim 1 wherein the switch includes:
a field effect transistor having a gate, a drain, and a source, wherein current flows from the drain to the source when a voltage greater than or equal to a threshold voltage is applied to the gate, and current does not flow from the drain to the source when a voltage less than the threshold voltage is applied to the gate; and
a trigger operable to reduce the gate's voltage below the threshold voltage.

10. The circuit of claim 1 wherein the switch includes:
a transistor having a base, a collector, and an emitter, wherein current flows from the collector to the emitter when a voltage greater than or equal to a threshold voltage is applied to the base, and current does not flow from the collector to the emitter when a voltage less than the threshold voltage is applied to the base; and
a trigger operable to reduce the base's voltage below the threshold voltage.

11. The circuit of claim 1 wherein the switch includes a trigger operable to close the switch.

12. The circuit of claim 1 wherein the switch includes:
a transistor having a base, a collector, and an emitter, wherein current flows from the collector to the emitter when a voltage greater than or equal to a threshold voltage is applied to the base, and current does not flow from the collector to the emitter when a voltage less than the threshold voltage is applied to the base; and
a trigger operable to increase the base's voltage above the threshold voltage.

13. The circuit of claim 1 wherein the switch includes:
a field effect transistor having a gate, a drain, and an source, wherein current flows from the drain to the source when a voltage greater than or equal to a threshold voltage is applied to the gate, and current does not flow from the drain to the source when a voltage less than the threshold voltage is applied to the gate; and
a trigger operable to increase the gate's voltage above the threshold voltage.

14. The circuit of claim 1:
wherein the switch closes to energize the voltage generator and opens to de-energize the voltage generator, repeatedly, to generate a pulsating current; and
further comprising a component operable to modify how long the switch remains closed each time it's closed.

15. The circuit of claim 1:
wherein the switch closes to energize the voltage generator and opens to de-energize the voltage generator, repeatedly, to generate a pulsating current; and
further comprising a resistor operable to modify how long the switch remains closed each time it's closed.

16. The circuit of claim 1 further comprising a diode to isolate the second voltage at the output node.

17. The circuit of claim 1 further comprising:
a battery coupled to the output node and operable to be charged by the second voltage;
a diode operable to prevent the battery from generating a voltage across the voltage generator while the power energizes the voltage generator.

18. The circuit of claim 1 wherein the voltage generator oscillates between the energized state and the de-energized state.

19. The circuit of claim 1 wherein the voltage generator automatically oscillates between the energized state and the de-energized state when the supply node is coupled to power.

20. A battery charger comprising:
a power source operable to provide power having a first voltage;
a circuit operable to generate a second voltage, the circuit including:
a supply node coupled to the power source and coupled to a conductor node,
an inductive voltage generator, having an air, iron, or ferrite core, coupled to the conductor node and operable to generate a magnetic field when the voltage generator is energized by the power, and operable to generate the second voltage on the conductor node from the magnetic field's collapse when the voltage generator is de-energized, wherein the second voltage is substantially greater than the first voltage,
an output node coupled directly to the conductor node to provide access to the second voltage, and
a switch operable to energize the voltage generator by allowing the voltage generator to receive the power, and operable to disconnect the power from the voltage generator to de energize the voltage generator.

21. The battery charger of claim 20 wherein the output node is coupled to a battery to be charged.

22. The battery charger of claim 20 wherein:
the output node is coupled to a battery to be charged, the battery having a third voltage, and
the first voltage is less than the third voltage.

23. The battery charger of claim 20 wherein the first voltage varies.

24. The battery charger of claim 20 wherein the power includes rectified, filtered alternating current.

25. The battery charger of claim 20 wherein the second voltage is high and the circuit is operable to provide the output node a large amount of current.

26. The battery charger of claim 20 further comprising a battery having a third voltage and connected to the output node, and wherein the circuit charges the battery while the first voltage is less than the third voltage.

27. The battery charger of claim 20 wherein the second voltage is used to charge at least one of the following types of batteries: a lead acid battery, a nickel cadmium battery, a nickel metal hydride battery, and a lithium-ion battery.

28. A method for charging a battery, the method comprising:
energizing a voltage generator comprising a single conductor of a circuit from a conductor node coupled to a power source to generate a magnetic field in the voltage generator, the magnetic field generated about an air, iron or ferrite core;
operating a switch to allow the voltage generator to receive power to energize the voltage generator, and to disconnect the power from the voltage generator to de-energize voltage generator to collapse the magnetic field in the voltage generator;
generating a voltage from the collapsing field on the conductor node of the voltage generator, wherein the generated voltage is substantially larger than the input voltage; and
isolating the voltage at an output node directly coupled to the conductor node of the circuit.

29. The method of claim 28 wherein energizing the voltage generator includes closing a switch to allow power to flow from a power source through the voltage generator.

30. The method of claim 28 wherein de-energizing the voltage generator includes opening a switch to prevent power from a power source from flowing through the voltage generator.

31. The method of claim 28 wherein energizing the voltage generator includes applying a voltage to a transistor's base to allow power to flow from a power source through the voltage generator.

32. The method of claim 28 wherein energizing the voltage generator includes applying a voltage to a field effect transistor's gate to allow power to flow from a power source through the voltage generator.

33. The method of claim 28 wherein de-energizing the voltage generator includes reducing a voltage applied to a transistor's base to prevent power from a power source from flowing through the voltage generator.

34. The method of claim 33 wherein de-energizing the voltage generator includes generating a trigger voltage to reduce a voltage applied to a transistor's base to prevent power from a power source from flowing through the voltage generator.

35. The method of claim 28 wherein de-energizing the voltage generator includes reducing a voltage applied to a field effect transistor's gate to prevent power from a power source from flowing through the voltage generator.

36. The method of claim 35 wherein de-energizing the voltage generator includes generating a trigger voltage to reduce a voltage applied to a transistor's gate to prevent power from a power source from flowing through the voltage generator.

37. The method of claim 28 further comprising:
re-energizing the voltage generator of the circuit to generate a subsequent magnetic field in the voltage generator; and
de-energizing the voltage generator to collapse the subsequent magnetic field in the voltage generator.

38. The method claim 28 further comprising capturing the voltage with a battery coupled to the output node.

39. A system comprising:
a battery charger that includes:
a power source operable to provide power having a first voltage;
a circuit operable to generate a second voltage, the circuit including:
a supply node coupled to the power source and coupled to a conductor node,
a voltage generator having a single conductor coupled to the conductor node and multiple coiled coaxial conductors operable to generate a magnetic field when the voltage generator is energized by the power, and operable to generate the second voltage on the conductor node from the magnetic field's collapse when the voltage generator is de-energized, wherein the second voltage is substantially greater than the first voltage;
an output node coupled directly to the conductor node to provide access to the second voltage, and
a switch operable to energize the voltage generator by allowing the voltage generator to receive the power, and operable to disconnect the power source from the voltage generator to de-energize the voltage generator;
a battery operable to power a load; and
a circuit controller operable to selectively connect and disconnect the battery charger to the battery.

40. The system of claim 39 wherein the circuit controller includes a processor operable to execute instructions.

41. The system of claim 39 wherein the circuit controller includes a circuit operable to confirm the presence of the battery before connecting the battery charger to the battery.

42. The system of claim 39 wherein the circuit controller monitors the voltage and/or temperature of the battery, and disconnects the battery from the battery charger when the battery is charged.

43. The system of claim 39 further comprising a second battery operable to power a load.

44. The system of claim 39 wherein the second voltage is used to charge at least one of the following batteries: a lead acid battery, a nickel cadmium battery, a nickel metal hydride battery, and a lithium-ion battery.

45. The system of claim 39 wherein the second voltage is used to rejuvenate at least one of the following batteries: a lead acid battery, a nickel cadmium battery, a nickel metal hydride battery, and a lithium-ion battery.

46. The circuit of claim 39 wherein the first voltage is less than the voltage of the battery while the battery charger charges the battery.

47. A circuit for generating a voltage, the circuit comprising:
a supply node operable to receive power having a first voltage;
a voltage generator comprising one conductor operable to generate a magnetic field when the voltage generator is energized by the power, and operable to generate a second voltage substantially larger than the first voltage, the second voltage generated from the magnetic field's collapse when the voltage generator is de-energized, wherein the voltage generator includes a substantially straight conductor that generates the second voltage from the magnetic field's collapse;
an output node directly coupled to the conductor operable to provide access to the second voltage; and
a switch operable to allow the voltage generator to receive power to energize the voltage generator, and operable to disconnect the power from the voltage generator to de-energize the voltage generator.

48. A circuit for generating a voltage, the circuit comprising:
a supply node operable to receive power having a first voltage;
a voltage generator having one conductor operable to generate a magnetic field when the voltage generator is energized by the power, and operable to generate a second voltage substantially larger than the first voltage, the second voltage generated from the magnetic field's collapse when the voltage generator is de-energized, wherein the voltage generator includes multiple, coiled conductors coupled parallel or coaxial to each other;
an output node directly coupled to the conductor operable to provide access to the second voltage; and
a switch operable to allow the voltage generator to receive power to energize the voltage generator, and operable to disconnect the power from the voltage generator to de-energize the voltage generator.

* * * * *

UNITED STATES PATENT AND TRADEMARK OFFICE
CERTIFICATE OF CORRECTION

| | | |
|---|---|---|
| PATENT NO. | : 7,990,110 B2 | Page 1 of 1 |
| APPLICATION NO. | : 11/592633 | |
| DATED | : August 2, 2011 | |
| INVENTOR(S) | : John C. Bedini et al. | |

It is certified that error appears in the above-identified patent and that said Letters Patent is hereby corrected as shown below:

- In Claim 20, Column 10, Line 28, "generator to de energize the voltage" should read --generator to de-energize the voltage--

Signed and Sealed this
Fourth Day of October, 2011

David J. Kappos
*Director of the United States Patent and Trademark Office*